(No Model.) 2 Sheets—Sheet 1.
R. M. REANEY.
COTTON, CORN, AND PEA PLANTER.

No. 341,505. Patented May 11, 1886.

Witnesses
W. E. Chaffee
Daniel Scott

Inventor
Robert M. Reaney
By his Attorney
H. N. Jenkins (No Model.) 2 Sheets—Sheet 2.

R. M. REANEY.
COTTON, CORN, AND PEA PLANTER.

No. 341,505. Patented May 11, 1886.

Witnesses
W. C. Chaffey
Daniel Scott

Inventor
Robert M. Reaney
By his Attorney
H. N. Jenkins

UNITED STATES PATENT OFFICE.

ROBERT MILLER REANEY, OF HARLEM, GEORGIA.

COTTON, CORN, AND PEA PLANTER.

SPECIFICATION forming part of Letters Patent No. 341,505, dated May 11, 1886.

Application filed January 4, 1886. Serial No. 187,630. (No model.)

*To all whom it may concern:*

Be it known that I, ROBERT MILLER REANEY, a citizen of the United States, and a resident of Harlem, county of Columbia, State of Georgia, have invented new and useful Improvements in Cotton, Corn, and Pea Planters, of which the following is a full and exact description, reference being had to the accompanying drawings, making part of this specification.

This invention relates to a labor-saving farm implement having the merit of being simple and durable in construction, as well as of being admirably adapted for planting either cotton-seed, corn, peas, or other grain.

The construction and operation of the implement are hereinafter fully described, and the novel features thereof specifically claimed.

Figure 1:
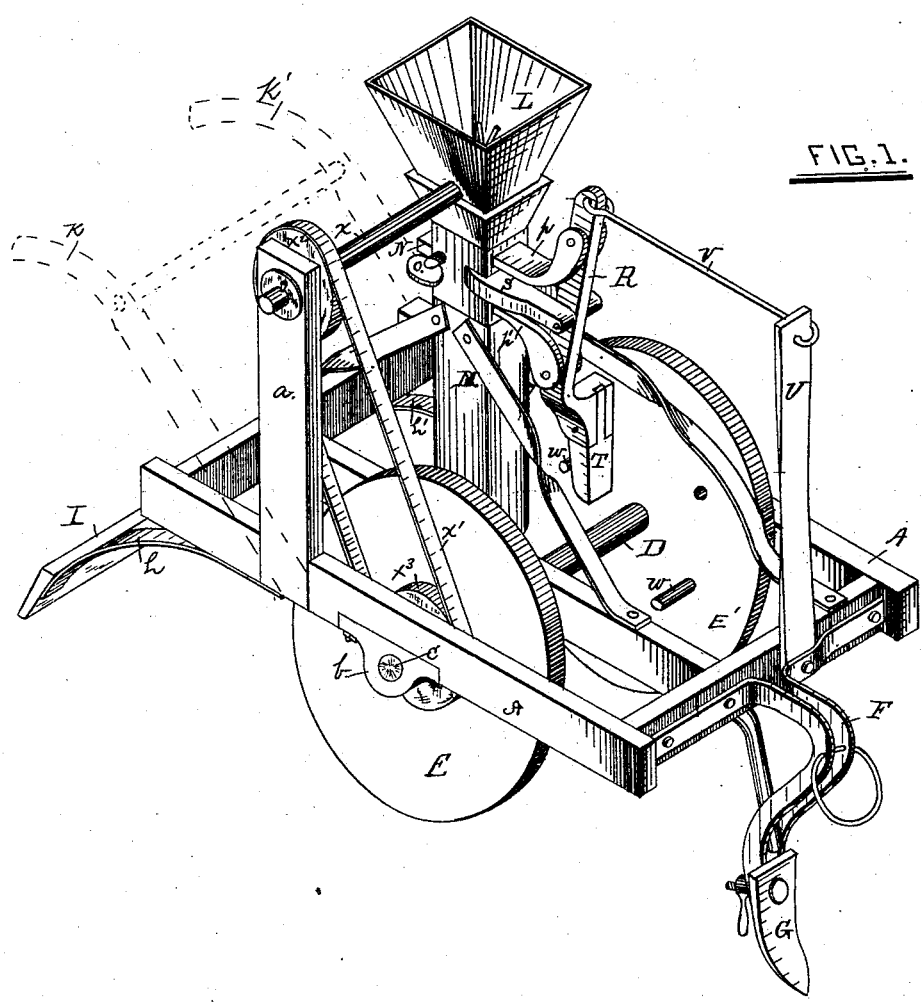
Figure 2:
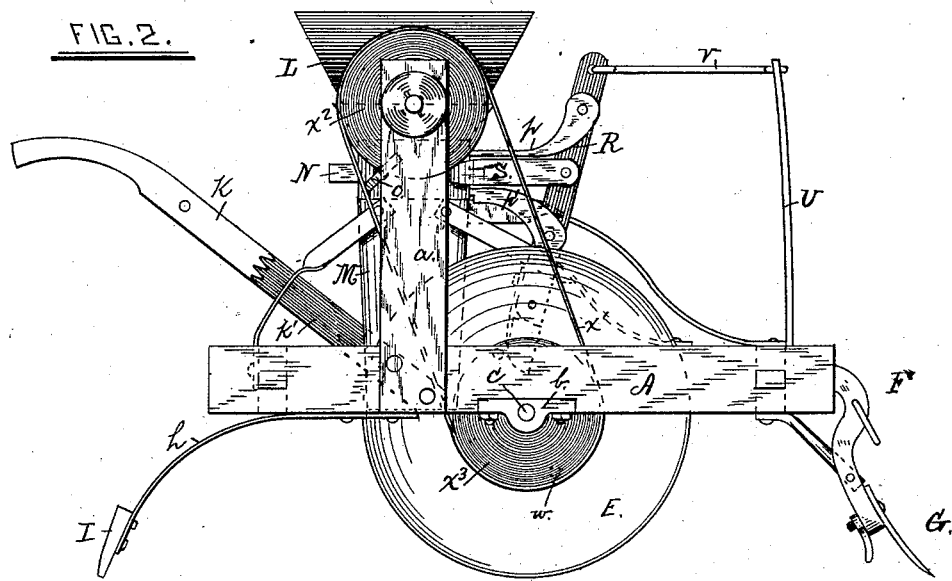
Figure 3:
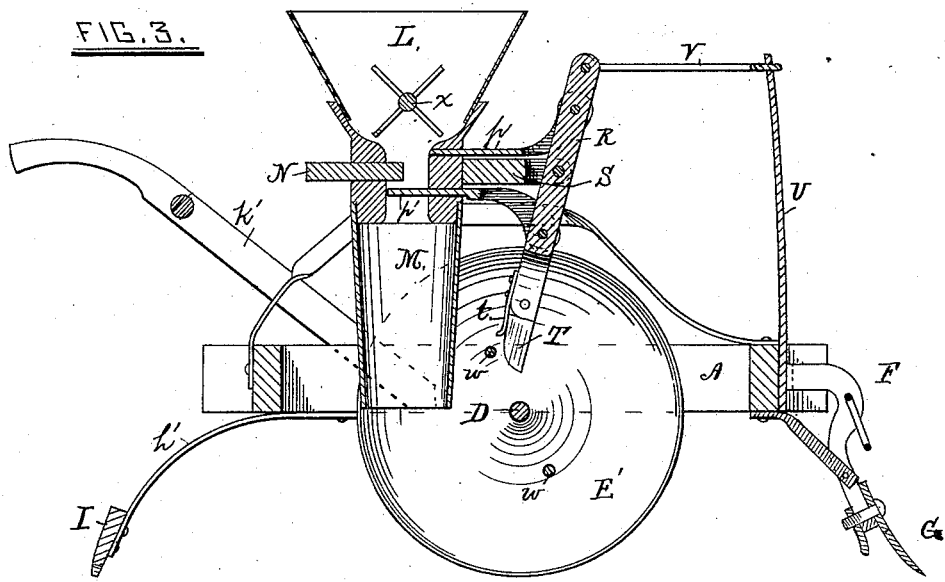

In the drawings, Figure 1 is a perspective view of the implement complete and ready for use. Fig. 2 is a side elevation thereof, and Fig. 3 is a vertical longitudinal section of the implement through the grain-hopper and its discharge-valves.

The machine is composed of a rectangular frame, A, having journal-boxes $b$ in the sides thereof for the reception of the journals $c$ of a shaft or axle, D, on which are secured the transporting-wheels E E'. The forward end of the frame A is provided with a clevis, F, and an opening point or plow, G, and to the rear end of the frame is connected, by means of springs $h\ h'$, a scraper, I, while above the same are secured the guiding-handles $k\ k'$. The seed-hopper L, with its discharge-tube M, is secured to the interior of the frame A in rear of the axle, as shown. In the upper part of the tube is fitted a sliding gage or gate, N, through which the flow of grain from the hopper is regulated. This gage or gate is adapted to slide in or out, as required, and be held in any desired position by means of a set-screw, O. (See Fig. 1.) Immediately above and below the aforesaid gage or gate are a pair of sliding valves, $p\ p'$, which project through openings in the front of the tube, and connect, either directly or through links, with a lever, R, that is pivoted to the outer end of the forwardly-projecting arm S. The lower end of the lever R is provided with a jointed section, T, backed up with a spring, $t$, for purposes hereinafter described.

At the front of the frame A is secured a vertical spring, U, the free end of which is adapted to be connected with the upper end of the lever R by a rod or link, $v$, whereby the aforesaid end of the lever is held in an outward position, except at such times as the lower end of the lever is being moved forward through the action of a pin, $w$, which is inserted in one of a series of perforations made in the inner face of the wheel at such distance from the axle as to insure the bringing of the pin in direct contact with the jointed section of the lever. The number of pins employed depends on the kind of seed or grain to be planted—for instance, in dropping peas, two pins are used at points directly opposite each other. In dropping corn, three pins are used at points equidistant, and in drilling cotton four pins are employed at regular distances apart. The amount of seed planted is regulated, as before stated, by the gage or gate N. The arrangement of the spring at the rear of the lower section of the lever R allows the said section to be swung backward, as the machine is moved rearwardly, without operating the lever or the valves connected therewith.

The letter $x$ designates a shaft, one end of which is journaled in an upright, $a$, at one side of the frame, and the other end projects through one side of the hopper. The latter end is provided with suitable arms or stirrers for agitating the grain, and thereby preventing the arching or packing of the same within the hopper. The shaft $x$ is operated by a belt, $x'$, which is arranged to operate over a pulley, $x^2$, secured on said shaft, and over a similar pulley, $x^3$, fitted on the main axle of the machine.

Having described my invention, what I claim as new, and desire to secure by Letters Patent, is—

The combination, in a seed-planting machine, of a hopper provided with a pair of reciprocating valves, and an adjustable gage between same, a lever pivotally connected with the forward end of each valve and to an intermediate projecting arm, as described, the said lever provided at its lower end with a spring jointed section adapted to be engaged by pins at the side of one of the traction-wheels, and a rod connecting the upper end of the lever with a spring attached to the frame of the machine, substantially as and for the purpose set forth.

In testimony whereof I affix my signature in presence of two witnesses.

ROBT. MILLER REANEY.

Witnesses:
M. A. McNAIR,
JNO. COLLINS.